Feb. 24, 1970     M. D. SMITH     3,496,801
POWER TRANSMISSION
Original Filed Oct. 21, 1966
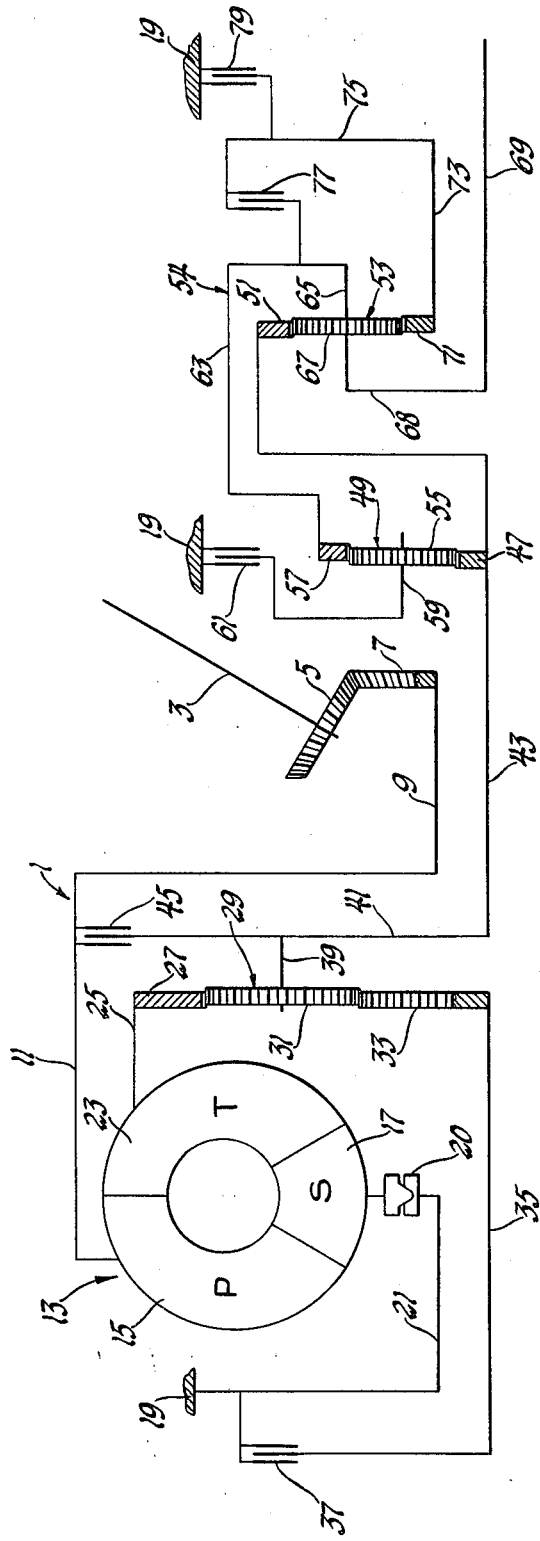
INVENTOR.
Marion D. Smith
BY
Charles L. White
ATTORNEY United States Patent Office 3,496,801
Patented Feb. 24, 1970

3,496,801
POWER TRANSMISSION
Marion D. Smith, Indianapolis, Ind., assignor to General Motors Corporation, Detroit, Mich., a corporation of Delaware
Continuation of application Ser. No. 588,528, Oct. 21, 1966. This application Dec. 23, 1968, Ser. No. 786,853
Int. Cl. F16h 47/08, 47/00
U.S. Cl. 74—688   5 Claims

ABSTRACT OF THE DISCLOSURE

Power transmission for vehicles having both torque converter and all-mechanical drives. For low range vehicle operation converter torque is multiplied by front and rear gearsets arranged so that developed power is smoothly applied to the transmission output. A converter bypass clutch is provided for two high range all-mechanical drives utilizing the gear ratios of the rear unit. A friction-drive-establishing device operatively connected to the front gearset can be disengaged to prevent power flow from the converter through the front gearset thereby eliminating vehicle creep in neutral.

---

This application is a continuation of application Ser. No. 588,528, filed Oct. 21, 1966, and now abandoned.

This invention relates to power transmissions and more particularly to a torque converter transmission having a front gear unit for multiplying converter torque and transmitting such torque to a multi-ratio range unit for low range hydrodynamic drives and further having a selectively engageable friction device for mechanical drive of the range unit for higher range mechanical drives.

This transmission is useable in many applications where hydraulic and mechanical drives are desirable and is particularly useful in vehicles having a low power to weight ratio such as city buses which are most frequently operated in relatively low speed ranges with frequent stops for discharging and picking up passengers and in which passenger comfort is highly desirable.

This invention makes efficient use of a hydrodynamic torque converter for smooth low range vehicle operation insuring that developed power is applied smoothly to the drive wheels and that the load does not lug and possibly damage the vehicle engine. In this transmission a front planetary unit provides means to increase the infinitely variable converter torque and transmit this torque to a multi-range forward and reverse planetary gear unit. The front unit incorporates a selectively engageable torque transmitting friction device for bypassing the converter to provide a connection to the range unit which may be selectively conditioned for a highly efficient reduction ratio mechanical drive for higher speed city driving or a 1:1 drive for open highway travel. One of the important features of this invention is the provision of a neutral clutch which, when disengaged, provides a neutral condition insuring that no converter torque is transmitted to the range unit to eliminate vehicle creep from converter torque.

It is an object of this invention to provide new and improved combined torque converter and mechanical power transmission featuring both torque converter drives and mechanical drives.

Another object of this invention is to provide a new and improved torque converter transmission having front and rear gear units providing a plurality of stepped hydraulic and mechanical forward drives and which is conditionable to provide a hydraulic reverse drive and a high speed mechanical reverse drive.

Another object of this invention is to provide a new and improved torque converter transmission for vehicles having a no-torque neutral to prevent torque from being transmitted by the transmission and thereby prevent vehicle creep.

Another object of this invention is to provide a torque converter transmission having a front gear unit for multiplying converter torque and a rear multi-ratio range unit for producing a plurality of stepped hydraulic and mechanical drives, to also provide a lockup for directly connecting the range unit to torque converter input bypassing the torque converter for multi-ratio all mechanical drives, and to further provide for selected release of the front unit control gear for an anti-creep neutral.

These and other objects of this invention will become more apparent from the following detailed description of a preferred embodiment of the invention in which the single figure illustrates diagrammatically an upper half of a torque converter transmission.

As shown in the figure, there is a power transmission 1 having an angle drive input shaft 3 such as that used on coaches or buses. This shaft is connected to drive angle drive bevel gear 5 and meshing bevel pinion 7 centrally located in the transmission. This pinion is drivingly connected to a sleeve shaft 9 and the housing 11 of a three element hydrodynamic torque converter 13. This torque converter has a pump 15 which is driven by the housing 11, a stator 17 which is connected to the transmission case 19 by a one-way brake 20 and sleeve shaft 21, and a turbine 23. The turbine provides converter output and drives a sleeve shaft 25 and connected ring gear 27 of a front torque multiplying planetary gear unit 29.

This planetary unit has planets 31 which simultaneously mesh with the ring gear 27 and a sun gear 33. This last mentioned sun gear is connected to the transmission case or ground 19 by a sleeve shaft 35 and by selectively applied multi-plate brake 37. As shown, brake 37 is located in front of the torque converter adjacent to the torque converter pump. The planets 31 are rotatably mounted on a carrier 39 which is connected by hub member 41 to a sleeve shaft 43. This sleeve shaft may be connected to the housing 11 by selected application of a multi-plate friction clutch 45 so that the input 3 can drive hub member 41.

As shown, the sleeve shaft 43 is connected to drive a sun gear 47 of a reverse planetary unit 49 and a ring gear 51 of a two-speed forward planetary gear unit 53. These latter mentioned planetary gear units combine to form the range gearing 54 of the transmission which cooperates with the front gear unit to provide an increased range of transmission ratios.

The sun gear 47 of the reverse planetary unit meshes with planets 55 which in turn mesh with the ring gear 57. A carrier 59 rotatably supporting these planets may be conditioned for reaction by application of a multi-plate brake unit 61 which has reaction plates grounded to the transmission case as illustrated. The output ring gear 57 of the reverse unit is attached to a drum 63 that is secured to the carrier 65 and the planet 67 of the forward drive planetary gear unit. As shown, this carrier is connected by hub 68 to a transmission output shaft 69.

The planets 67 of the forward drive planetary gear unit mesh with a sun gear 71 connected to a sleeve shaft 73 which may be connected to the carrier 65 by a drum 75 and a multi-plate clutch 77 for unit lockup. To establish a forward reduction ratio in this gear unit the sun gear 71 may be retarded from rotation by selected application of a multi-plate friction brake 79 which includes reaction plates suitably secured to the transmission case 19.

For the lowest range hydraulic drive the brakes 37 and 79 are applied by suitable controls which are not illustrated. When these reaction devices are applied, it will be seen that the front planetary unit is conditioned to multiply converter torque with ring gear input, carrier output and sun gear control. The multiplied converter torque will be further multiplied by the range unit with sun gear 71 held for reaction, ring gear input and carrier output. With the angle input driving the torque converter pump and with the front unit and range gear conditioned as described, a low range ratio of 2.08, for example, may be obtained by an appropriate selection of teeth numbers for the planetary gear units 29 and 53.

In a second range converter drive, the brake 37 is maintained. Low range brake 79 is released and lockup clutch 77 for the range unit is engaged. Under these conditions the front unit is still conditioned to multiply converter torque while the forward drive planetary unit is locked up for direct transmittal of torque. Since the front unit provides the torque multiplication, its ratio, 1.58 for example, will provide the torque multiplication for second range hydraulic drive. These two hydraulic underdrives have important benefits in that the converter is capable of absorbing vibration appearing in the transmission or slipping to provide engine protection. Such low range converter drives improve passanger comfort even with frequent vehicle starts and stops.

In third range, which is an efficient all mechanical drive, the clutch 77 and brake 37 are released. The low range brake 79 and the lockup clutch 45 are applied. Under these conditions the angle drive shaft will directly drive the ring gear input of the forward drive planetary unit and, since the sun gear 71 of this unit is held for reaction, there will be torque multiplied with the carrier driving the transmission output shaft 69 at a reduced ratio. This ratio may, for example, be 1.32 which is highly suitable for higher range city driving. It will be appreciated that in this drive range there is bypass of the torque converter and the front planetary gear unit and that this range is higher than either of the hydraulic underdrives.

An efficient 1:1 direct mechanical drive for open highway driving is provided by releasing the brake 79 and engaging the lockup clutch 77. With the lockup clutch 77 engaged the forward drive unit is locked up for rotation as a unit, and engine power is transmitted by the transmission without torque multiplication.

Reverse may be obtained by applying only brake 37 for the front unit sun gear and the brake 61 for carrier of the reverse planetary unit 49. Under these conditions there will be converter torque as multiplied by the front gear unit to the sun gear 47 of the reverse unit. The ring gear 57, the drum 63, the carrier 65 and the transmission output 69 will be driven in a reverse direction and at a reduced speed to provide the desired reverse drive.

For a high speed mechanical reverse drive, only lockup clutch 45 and brake 61 are applied. Under these conditions it will be seen that the converter and the reduction planetary 29 will be bypassed and the input sun gear 47 of the reverse planetary unit 49 will be driven at a higher speed by the ratio provided by the bevel gears 5 and 7.

For anti-creep neutral the brake 37 and clutch 45 are released so that no torque can be transmitted through the transmission.

It will be appreciated that the detailed description and drawing are illustrative of but one embodiment of this invention which may be modified in accordance with specific needs and circumstances. The scope of this invention is therefore not to be limited by the particularly illustrated and described embodiment but by the claims appended hereto.

What is claimed is:

1. In a power transmission having an input and an output, a hydraulic unit having an input rotor and having an output rotor, a front gear unit and a rear gear unit, a housing for said unit drivingly connected to said input rotor, said housing having an input gear disposed between said front and rear gear units for drivingly connecting said transmission input to said housing, said front gear unit being disposed between said hydrodynamic unit and said rear unit for operatively connecting said output rotor to said rear unit, said front unit comprising a planetary gear set having a first gear operatively connected to said output rotor, a second gear adapted to be held for reaction, planet gears meshing with said first and second gears and a carrier for said planetary gears, a selectively engageable brake means disposed at one end of said transmission adjacent to said input rotor and operatively connected to said second gear to condition said front gear unit for a predetermined speed reducing ratio when engaged and to prevent torque from being supplied from said hydrodynamic unit to said rear gear unit and to said transmission output when disengaged, said carrier providing an output for said front unit, said rear unit comprising a compound planetary gear set having an input member operatively connected to said carrier of said front gear unit and having an output member operatively connected to said transmission output, a first selectively engageable drive establishing means directly connected to said rear planetary unit to condition said transmission for a hydraulic drive and to first and lowest speed ratio forward when said brake means is also engaged, a second selectively engageable drive establishing means operatively connected to said rear unit and engageable to condition said rear unit for its highest speed ratio forward and said transmission for a hydraulic unit drive and its second speed ratio forward when said brake means is also engaged, and a third selectively engageable drive establishing means operatively connected to said rear unit for conditioning said rear unit for a reverse drive ratio when engaged and said transmission for a reverse drive ratio when said brake means is also engaged.

2. The power transmission of claim 1 and further including selectively engageable clutch means operatively connected to transmission input and said input member of said rear unit between said transmission input and said torque converter and selectively engageable to provide a torque-transmitting connection to said rear unit bypassing said hydrodynamic unit for conditioning said transmission for a third forward speed ratio directly driven by said transmission input when only said first drive establishing means of said rear unit is also engaged and further conditioning said transmission for a fourth and highest forward speed transmission ratio when only said second drive establishing means of said rear unit is also engaged.

3. In a power transmission having an input and an output, a torque converter having a pump operatively connected to said input and having a turbine and a stator, a front gear unit and a rear gear unit, said front gear unit being disposed directly between said torque converter and said rear unit for operatively connecting said turbine to said rear unit, said front unit comprising a planetary gear set having a first gear operatively connected to said turbine, a second gear adapted to be held for reaction, planet gears meshing with said first and second gears and a carrier for said planetary gears, a selectively engageable brake means operatively connected to said second gear to condition said front gear unit for a predetermined speed reducing ratio when engaged, said carrier providing an output for said front unit, said rear unit comprising a compound planetary gear set having an input member operatively connected to said carrier of said front gear unit and having an output member operatively connected to said transmission output, a first selectively engageable drive establishing means directly connected to said rear planetary unit to condition said rear unit for its lowest speed ratio forward and said transmission for a torque converter drive and a first drive range when said brake means is engaged, a second selectively engageable drive establishing means operatively connected to said rear unit and engageable to condition said rear unit for its highest speed ratio forward and said transmission for a torque converter drive and a second drive range when said brake means is engaged, and a third selectively engageable drive establishing means operatively connected to said rear unit for conditioning said rear unit for a reverse drive ratio when engaged and said transmission for a reverse drive ratio when said brake means is engaged, a selectively engageable clutch means operatively connected to transmission input and said input member of said rear unit between said transmission input and said torque converter and selectively engageable to provide a torque-transmitting connection to said rear unit bypassing said hydrodynamic unit for conditioning said transmission for a mechanical drive and a third drive range when said first drive establishing means of said rear unit is engaged and further conditioning said transmission for a mechanical drive and a fourth and highest forward speed drive range when said second drive establishing means of said rear unit is engaged, said front unit being a simple planetary gear set having a ring gear and a sun gear operatively connected by said planet gears, said rear unit being operatively connected planetary gear sets, said brake means being operative to hold said sun gear of said front unit thereby conditioning said front unit for multiplying converter torque when said first gear is driven by said turbine, and said brake means being releasable to prevent the flow of power from said torque converter to said rear unit thereby establishing a no-torque neutral when said selectively engageable clutch means is disengaged.

4. In a power transmission having transmission input means and transmission output means, a hydrodynamic torque converter having a pump driven by said input means and having a turbine providing converter output, a first planetary gear unit for multiplying converter torque having a first gear directly connected to said turbine and having a second gear and having planet gears connecting said first and second gear and further having a carrier for said planet gears, brake means operatively connected to said second gear and selectively engageable to retard rotation thereof to thereby condition said front unit for a speed reducing ratio so that it can multiply the torque produced by said converter and disengageable to prevent converter torque from being transmitted by said gear unit, a rear planetary unit having an input operatively connected to said carrier and having an output operatively connected to said transmission output, said rear unit comprising first and second operatively connected planetary gear sets, first friction means operatively connected to said rear unit and selectively engageable for establishing a converter driven first speed drive when said brake means is engaged, second friciton means operatively connected to said rear unit and engageable to lock up said rear unit for transmission for a mechanically driven third speed drive when said brake means is engaged, clutch means selectively engageable to directly connect said transmission input means to said rear unit input for conditioning said transmission for a mechanically driven third speed drive when said first friction means is engaged and for conditioning said transmission for a mechanically driven fourth and highest speed drive when said second friction means is engaged, said transmission input means comprising a transmission input drive member disposed between said front and rear planetary gear units and a housing for said torque converter operatively coupling said transmission input drive member and said torque converter pump, said second gear of said first planetary gear unit being a sun gear, said brake means for said sun gear being disposed in front of and adjacent to said torque converter pump, said first and second planetary gear sets of said rear planetary gear unit each having a sun gear and a ring gear operatively connected by planet gears and a carrier for said planet gears, said sun gear of said first planetary gear set being drivingly connected to said carrier of said front planetary unit and said ring gear of said second planetary gear set, said ring gear of said first planetary gear set being drivingly connected to said carrier of said second planetary gear set, and said last mentioned carrier being drivingly connected to said transmission output means, said first friction means being a brake operatively connected to said sun gear of said second planetary gear set, said second friction means being a selectively engageable clutch for connecting said carrier and said sun gear of said second planetary gear set to lock up said second planetary gear unit when engaged, and a selectively engageable brake operatively connected to said carrier of said first planetary gear set to condition said rear unit for reverse drive when engaged.

5. In a power transmission having an input and an output, a hydrohynamic unit having an input rotor operatively connected to said input and having an output rotor, a front gear unit and a rear gear unit, said input being disposed between said front and rear gear units, said front gear unit being disposed directly between said hydrodynamic unit and said rear unit for operatively connecting said output rotor to said rear unit, said front unit comprising a planetary gear set operatively connected to said output rotor, a selectively engageable brake means operatively connected to said front unit to condition said front gear unit for a predetermined speed reducing ratio when engaged and to prevent torque from being supplied from said hydrodynamic unit to said rear gear unit and to said transmission output when disengaged, said brake means being located in front of said hydrodynamic unit, connecting means extending coaxially with and through said hydrodynamic unit for connecting said brake means and said front gear unit, said rear unit comprising a compound planetary gear set having an input member operatively connected to said front gear unit and having an output member operatively connected to said transmission output, a first selectively engageable drive establishing means directly connected to said rear planetary unit to condition said transmission for a hydraulic drive and a first and lowest speed ratio forward when said brake means is also engaged, a second selectively engageable drive establishing means operatively connected to said rear unit and engageable to condition said rear unit for its highest speed ratio forward and said transmission for a hydraulic unit drive and its second speed ratio forward when said brake means is also engaged, a third selectively engageable drive establishing means operatively connected to said rear unit for conditioning said rear unit for a reverse drive ratio when engaged and said transmission for a reverse drive ratio when said brake means is also engaged and selectively engageable mechanical drive clutch means operatively disposed between said input and said rear gear unit for drivingly connecting said input to said rear unit for all mechanical drive when said brake means is disengaged and said first or second drive establishing means are engaged.

References Cited
UNITED STATES PATENTS

| | | | |
|---|---|---|---|
| 2,667,085 | 1/1954 | Ackerman | 74—763 X |
| 2,699,074 | 1/1955 | Livezey et al. | 74—731 X |
| 2,722,141 | 11/1955 | Swift | 74—763 |
| 2,894,415 | 7/1959 | Miller | 74—688 |
| 2,930,258 | 3/1960 | Flinn | 74—688 X |
| 3,053,116 | 9/1962 | Christenson et al. | 74—732 X |
| 3,270,586 | 9/1966 | Tuck et al. | 74—688 X |
| 3,347,113 | 10/1967 | Ramsel | 74—688 |

DONLEY J. STOCKING, Primary Examiner

T. C. PERRY, Assistant Examiner

U.S. Cl. X.R.

74—730

PO-1050
(5/69)

UNITED STATES PATENT OFFICE
CERTIFICATE OF CORRECTION

Patent No. 3,496,801   Dated February 24, 1970

Inventor(s) Marion D. Smith

It is certified that error appears in the above-identified patent and that said Letters Patent are hereby corrected as shown below:

In the claims, Claim 4, Column 5, line 51, delete "transmission for a mechanically driven third" and insert -- establishing a converter driven higher second --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents